R. F. FENCHEL.
ICE CREAM SCOOP.
APPLICATION FILED NOV. 27, 1915. RENEWED JAN. 2, 1917.
1,236,279.
Patented Aug. 7, 1917.
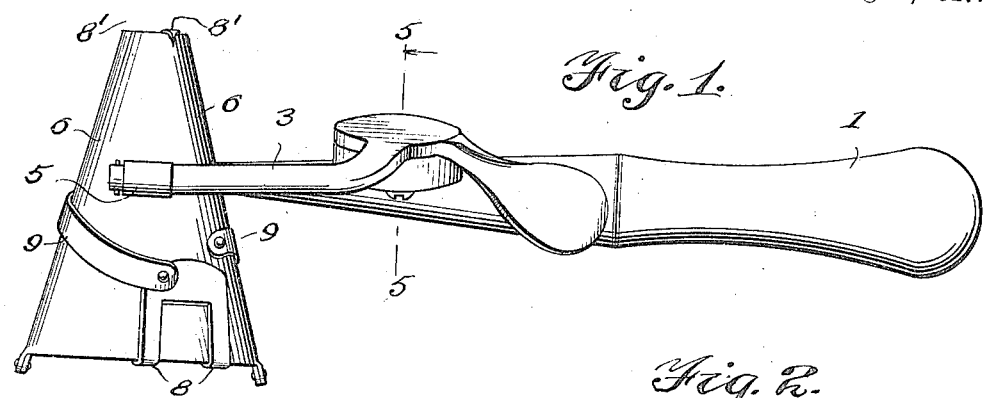
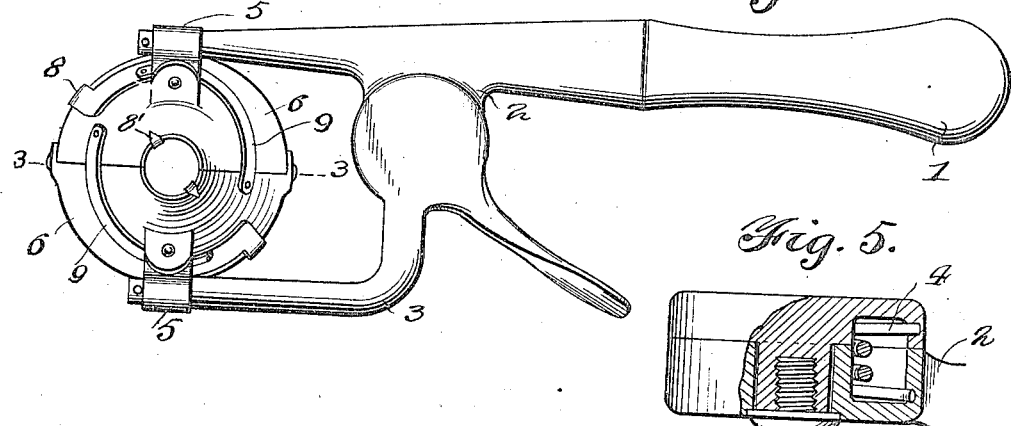
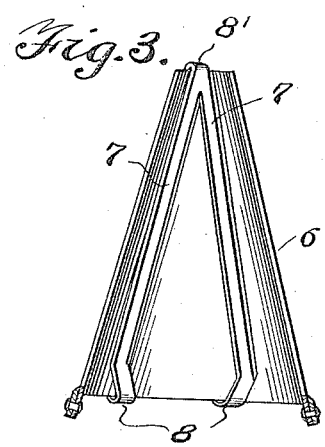
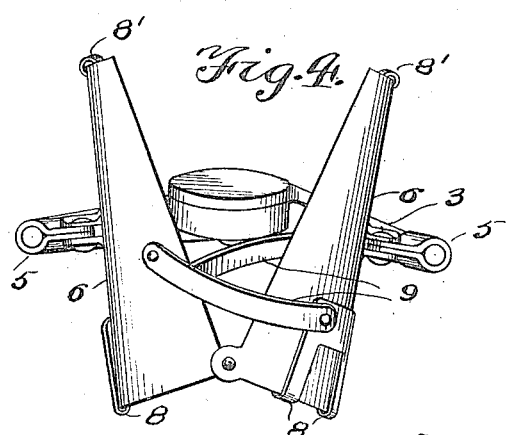
Inventor
R. F. Fenchel.
By Victor J. Evans
Attorney

UNITED STATES PATENT OFFICE.

RINHOLD F. FENCHEL, OF BEAVER FALLS, PENNSYLVANIA.

ICE-CREAM SCOOP.

1,236,279.  Specification of Letters Patent.  Patented Aug. 7, 1917.

Application filed November 27, 1915, Serial No. 63,791. Renewed January 2, 1917. Serial No. 140,305.

*To all whom it may concern:*

Be it known that I, RINHOLD F. FENCHEL, a citizen of the United States, residing at Beaver Falls, in the county of Beaver and State of Pennsylvania, have invented new and useful Improvements in Ice-Cream Scoops, of which the following is a specification.

This invention relates to scoops especially adapted to be used for dipping ice cream to fill cones and it consists in the novel features hereinafter described and claimed.

An object of the invention is to provide a scoop of the character indicated which may be used for separating a quantity of cream from a volume thereof, the said separated quantity being formed in the shape of a cone and which therefore will fit snugly within the cone receptacle provided for its reception.

With this object in view the scoop comprises a handle with a spring actuated lever pivoted thereon, there being provided at the free ends of the handle and lever pivoted sleeves to which the sides of the scoop are pivoted. The scoop proper includes two halves which are in the form of sections of a cone and blades are movably mounted along the inner surfaces of the halves of the scoop proper and have end portions which overlap the opposite edges thereof. Links are provided upon the body of the scoop proper and the links are pivotally connected at one end with the sections and pivotally connected at their other ends with the said blades whereby the blades are caused to move along the inner surfaces of the cone sections when the said sections are swung apart. The cone sections are pivotally connected together at their larger ends, consequently the cream as it enters the body of the scoop passes in at the larger end of the cone and inasmuch as the smaller ends of the cone may be spread apart the quantity of cream which is dipped may gravitate between the smaller ends of the cone sections when they are spread and hence the separated body of cream may enter the cone shaped receptacle and completely fill the same.

In the accompanying drawing:—

Figure 1 is a side elevation of the device.

Fig. 2 is a top plan view of the same.

Fig. 3 is an inside view of one of the scoop sections.

Fig. 4 is an end view of the device.

Fig. 5 is a detail view of parts of the device showing portions in section.

The scoop comprises a handle 1 which is provided at a point between its ends with a laterally disposed lug 2. A lever 3 is pivotally mounted upon the lug 2 and a spring 4 operates upon the lever and is under tension with a tendency to normally hold the free or forward end of the said lever toward the forward end portion of the handle 1. Collars 5 are pivotally mounted upon the end portions of the handle 1 and the lever 3 and the said collars may turn on the said parts which serve as axes. Scoop sections 6 are pivotally mounted at the inner portions of the collars 5, and the axes of the pivotal connections between the scoop sections and the collars are at right angles to the axes between the collars and the handle and lever. The scoop sections 6 are formed from thin metal and they are in the shape of sections of a cone and pivoted together at their larger end portions. Blades 7 are mounted for movement along the inner surfaces of the scoop sections 6 and the said blades are of general V-shaped configuration. The blades 7 are provided at the larger ends of the sections 6 with flanges 8 which extend over and around the larger ends of the scoop sections 6. The blades 7 are provided at the smaller ends of the sections 6 with flanges 8′ which extend around the edges of the smaller ends of the said sections. Spiral shaped links 9 are pivoted at one end to the scoop sections 6 and at their other ends are pivotally connected with the flanges 8 of the blades 7. The links 9 are located at the exterior of the scoop sections 6 and one end of each blade is connected with one scoop section and the other end of each link is connected with the blade upon the other scoop section.

The arrangement of the parts is such that when the lever 3 is swung against the tension of the spring 4 the free or forward end of the said lever is carried away from the adjacent forward end of the handle 1 and consequently the smaller or lower end of the scoop sections 6 are spread with relation to each other. During this movement on the part of the scoop sections 6 the connecting links 9 move the blades 7 along the inner surfaces of the scoop sections 6 and the flanges 8 are moved along the opposite edges of the said scoop sections. As soon as pressure is removed from the inner end of the lever 3 the tension of the spring 4 comes into play whereby the free or forward end of the lever 3 is moved back toward the forward end of the handle 1 and the smaller ends of the scoop sections 6 are brought together.

In dipping the cream from a can or other container pressure is not applied to the lever 3. Thus the scoop sections 6 may accumulate a body or quantity of the cream. When it is desired to permit the said body to gravitate from the scoop sections pressure is applied to the lever 3 whereby it is swung as above described and the smaller ends of the scoop sections are spread apart. At the same time the blades move along the inner surfaces of the scoop sections and scrape or cut the cream from the same. The cream which at this time is in the form of a cone may gravitate from the scoop sections between the smaller ends thereof and drop into a cone shaped receptacle provided for its reception.

From the foregoing description taken in conjunction with the accompanying drawing, it will be seen that a scoop of simple and durable structure is provided and that the same may be conveniently and economically used for filling cone shaped receptacles with solid bodies of cream.

Having described the invention what is claimed is:—

A scoop comprising a handle, a lever pivoted thereon, scoop sections pivoted together and pivotally connected one with the handle and the other with the lever, blades movably mounted along the scoop sections and links pivotally connected at one end with the scoop sections and at their other ends with the blades, the link which is connected with one section being connected with the blade on the other section.

In testimony whereof I affix my signature in presence of two witnesses.

RINHOLD F. FENCHEL.

Witnesses:
 JACOB MUNNALS,
 WILLIAM MILLER.

Copies of this patent may be obtained for five cents each, by addressing the "Commissioner of Patents, Washington, D. C."